L. BINGAMAN.
Apparatus for Transmitting Motion.
No. 154,008. Patented Aug. 11, 1874.
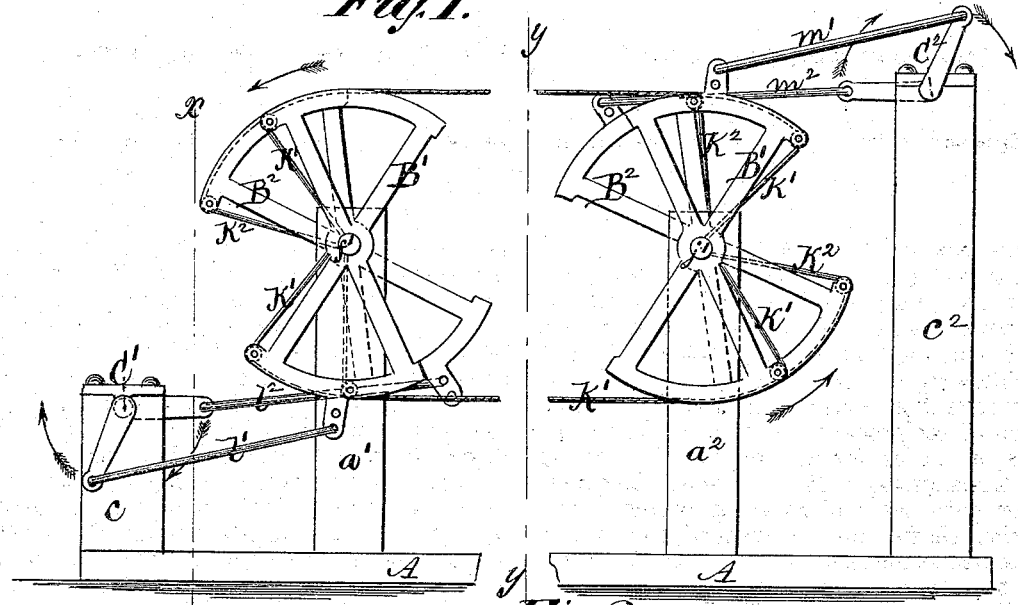
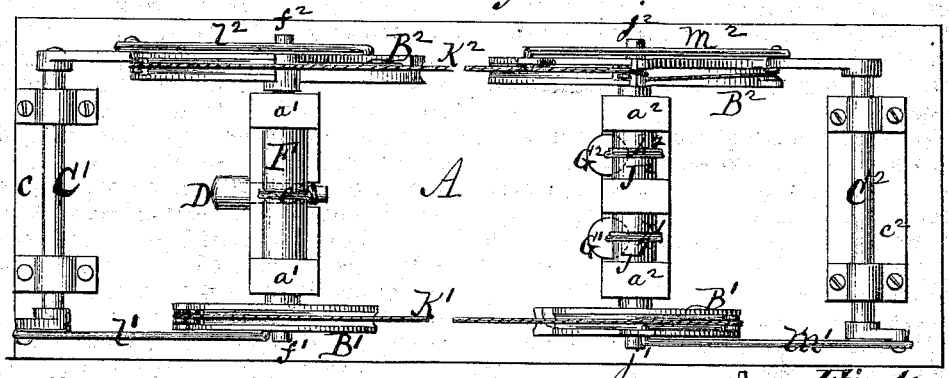
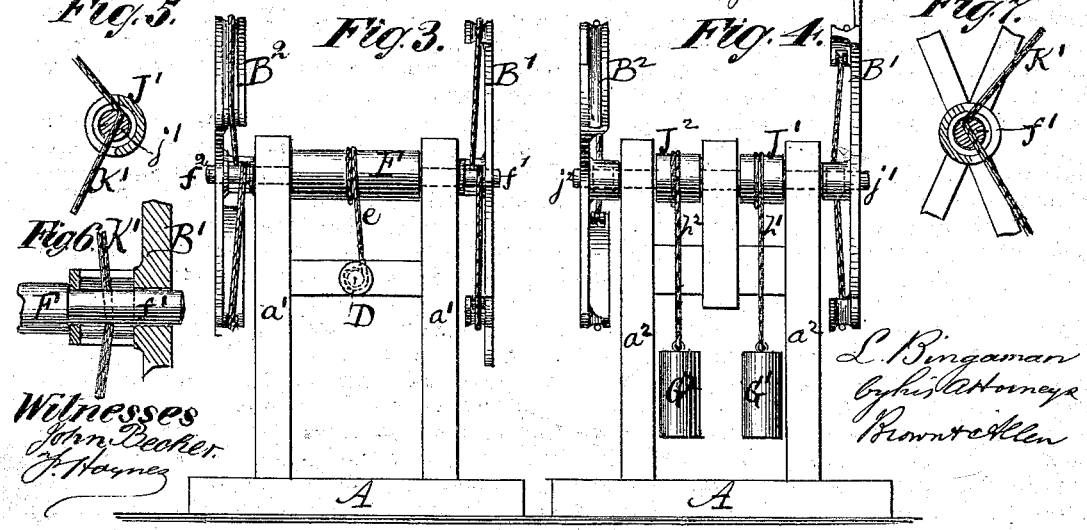

UNITED STATES PATENT OFFICE.

LEVI BINGAMAN, OF COVENTRYVILLE, PENNSYLVANIA.

IMPROVEMENT IN APPARATUS FOR TRANSMITTING MOTION.

Specification forming part of Letters Patent No. 154,008, dated August 11, 1874; application filed July 6, 1874.

*To all whom it may concern:*

Be it known that I, LEVI BINGAMAN, of Coventryville, in the county of Chester and State of Pennsylvania, have invented an Improved Apparatus for Transmitting Motion, of which the following is a specification:

My invention consists in, first, the combination of reciprocating beams connected by cords or chains, for the purpose of receiving and transmitting motion; second, the combination with the reciprocating beams of two rotating shafts, one for transmitting motion to the beams and the other for receiving motion therefrom; third, the combination of a spindle, cord, and shaft, for adjusting to a proper degree of tension the cords or chains which connect the beams; fourth, the combination of weights, cords, and arbors, for automatically tightening the cords or chains when necessary.

In the accompanying drawing, Figure 1 is a side view of my improved apparatus. Fig. 2 is a top view. Fig. 3 is a transverse vertical section taken in the line $x\,x$ of Fig. 1. Fig. 4 is a transverse vertical section taken in the line $y\,y$ of Fig. 1. Figs. 5, 6, and 7 are enlarged detail views.

A represents a base or platform, from which extend upward two standards, $a^1\,a^1$, in the upper portions of which is a shaft, F, with its gudgeons $f^1\,f^2$ projecting beyond the outer sides of the standards. At a suitable distance from the standards $a^1\,a^1$ are two other standards, $a^2\,a^2$, in the upper portions of which are arranged two arbors, $J^1\,J^2$, having gudgeons $j^1\,j^2$ projecting beyond the outer sides of the standards, the inner ends of the arbors having their bearings in a block located between the standards $a^2\,a^2$, so that said arbors are independent of each other. The gudgeons $f^1\,f^1$ form bearings for a pair of oscillating beams, $B^1\,B^1$, connected by cords, chains, or bands $K^1$, and the gudgeons $f^2\,f^2$ form bearings for a similar pair of beams $B^2\,B^2$, similarly connected by cords, chains, or bands $K^2$. When motion is applied to either one of the beams $B^1$ or $B^2$, it is transmitted to the other beam by means of the cord or chain. The ends of the beams $B^1\,B^2$ are preferably arc-shaped, so that the cords or chains will always maintain a rectilineal position. The beams of each pair may be placed at any desired distance apart, and, if necessary, they may be provided with tightening-pulleys for the band, arranged at suitable points between them, when the distance between the beams is such as to cause a slackening of the cord or chain. At a suitable distance from the standard $a^1$ is a standard, $c$, in the upper portion of which is journaled a rotating shaft, $C^1$, provided with a crank at each end, said cranks being at right angles with each other. One of said cranks is connected by a rod, $l^1$, with one of the beams $B^1$, and the other crank is connected by a rod, $l^2$, with one of the beams $B^2$. The beams $B^1$ and $B^2$ are arranged on the gudgeons $f^1\,j^1$ and $f^2\,j^2$, at an angle of about forty-five degrees with relation to each other, so that as the cranks on the shaft $C^1$ are at an angle of ninety degrees with relation to each other the motion transmitted from the shaft $C^1$ to the beams is more uniform, and the shock in passing the dead-points is less than would be the case if the cranks were arranged diametrically opposite each other. In order to still further accomplish the desired object the shaft $C^1$ may be provided with a fly-wheel. The rods $l^1\,l^2$ may connect with the beams $B^1\,B^2$ at the extreme lower ends of said beams, or at any desired points between the ends and centers of motion of the beams. As motion is applied to the shaft $C^1$ it is communicated by the rods $l^1\,l^2$ to the beams $B^1\,B^2$, and through the chains or cords and the other beams of each pair it is transmitted to any desired distance.

The cords, chains, or bands $K^1\,K^2$ are passed over the arc-shaped ends of the beams $B^1\,B^2$, and their ends are passed through holes made diametrically in the gudgeons $f^1\,j^1\,f^2\,j^2$, and secured by joining them together or by knotting them. In either case the cords may be wrapped once or more around the gudgeons, in order to give it the proper purchase.

To the shaft F is attached one end of a cord, $e$, which is wound around the shaft and has its other end attached to a spindle, D, arranged between the standards $a^1\,a^1$. When the cords or chains are first put in place they are adjusted to the proper tension by turning the spindle D, effect of which is to turn the gudgeons $f^1\,f^2$ and tighten the cords which are attached thereto.

To the arbors $J^1$ $J^2$ are attached cords $h^1$ $h^2$, which are passed around said arbors, and have weights $G^1$ $G^2$ attached to the lower ends. These weights serve to keep the cords or chains properly stretched, and at the same time allow for the contraction and expansion of the same, the weights and cords operating to turn the gudgeons through which the ends of the cords or chains $K^1$ $K^2$ are passed.

Near the end of the base or platform A farthest from the standard $c$ is another standard, $c^2$, in the upper portion of which is journaled a rotating shaft, $C^2$, having a crank at each end, said cranks being at right angles to each other, and connected to the beams $B^1$ $B^2$ by rods $m^1$ $m^2$.

The shaft $C^2$ may be arranged at any desired height above the platform, and the rods may be connected at any suitable points between the ends and the centers of oscillation of the beams.

Power may be applied to either one of the shafts $C^1$ $C^2$, and motion transmitted from the opposite one to the machinery to be driven.

What I claim as my invention, and desire to secure by Letters Patent, is—

1. The combination of the reciprocating beams $B^1$ $B^2$, connected by cords or chains $K^1$ $K^2$, substantially as and for the purpose shown and described.

2. The combination of the rotating shafts $C^1$ $C^2$ with the reciprocating beams $B^1$ $B^2$, substantially as and for the purpose shown and described.

3. The combination of the spindle D, cords $e$, and shaft F, substantially as and for the purpose shown and described.

4. The independent automatic tightening devices, consisting of the weights $G^1$ $G^2$, cords $h^1$ $h^2$, and arbors $J^1$ $J^2$, arranged and operating substantially as and for the purpose shown and described.

LEVI BINGAMAN.

Witnesses:
BENJ. W. HOFFMAN,
VERNON H. HARRIS.